United States Patent [19]

Araki

[11] 4,443,746

[45] Apr. 17, 1984

[54] CONTROL CIRCUIT FOR STEPPING MOTOR

[75] Inventor: Shigeru Araki, Tamayama, Japan

[73] Assignee: Alps Electric Co., Ltd., Tokyo, Japan

[21] Appl. No.: 300,441

[22] Filed: Sep. 8, 1981

[30] Foreign Application Priority Data

Sep. 6, 1980 [JP] Japan .................... 55-122943

[51] Int. Cl.³ .................................. H02K 29/02
[52] U.S. Cl. .................................. 318/696; 318/685
[58] Field of Search ............... 318/314, 327, 685, 696

[56] References Cited

U.S. PATENT DOCUMENTS

| 4,158,800 | 6/1979 | Jahelka et al. | 318/685 |
| 4,200,812 | 4/1980 | Fichter | 307/265 |
| 4,283,672 | 8/1981 | Throssell | 318/696 |

Primary Examiner—G. Z. Rubinson
Assistant Examiner—Saul M. Bergmann
Attorney, Agent, or Firm—Guy W. Shoup; Gerard F. Dunne

[57] ABSTRACT

A stepping motor-control circuit based on the microstep control comprises an up-down-counter, a circuit for determining an excitation sequence for respective phases of the stepping motor in accordance with a count output of the counter, and a circuit for generating a stepped waveform excitation signal in accordance with the count output of the counter, so that the excitation state of each phase of the stepping motor is controlled in a stepped waveform consisting of a plurality of steps. The stepping motor is permitted to operate at high speed by raising the frequency of a reference clock signal applied thereto.

3 Claims, 6 Drawing Figures

Fig. 4

DECODE SEQUENCE

| NO. | OUTPUT OF COUNTOR 1 | | | | INPUT TO DECODER 15 | | | INPUT TO DECODER 16 | | | RESISTORS TURNED ON |
|---|---|---|---|---|---|---|---|---|---|---|---|
| | $Q_A$ | $Q_B$ | $Q_C$ | $Q_D$ | A | B | C | A | B | C | |
| 0 | 0 | 0 | 0 | 0 | 0 | 0 | 0 | 1 | 1 | 1 | $R_1, R_8'$ |
| 1 | 1 | 0 | 0 | 0 | 1 | 0 | 0 | 0 | 1 | 1 | $R_2, R_7'$ |
| 2 | 0 | 1 | 0 | 0 | 0 | 1 | 0 | 1 | 0 | 1 | $R_3, R_6'$ |
| 3 | 1 | 1 | 0 | 0 | 1 | 1 | 0 | 0 | 0 | 1 | $R_4, R_5'$ |
| 4 | 0 | 0 | 1 | 0 | 0 | 0 | 1 | 1 | 1 | 0 | $R_5, R_4'$ |
| 5 | 1 | 0 | 1 | 0 | 1 | 0 | 1 | 0 | 1 | 0 | $R_6, R_3'$ |
| 6 | 0 | 1 | 1 | 0 | 0 | 1 | 1 | 1 | 0 | 0 | $R_7, R_2'$ |
| 7 | 1 | 1 | 1 | 0 | 1 | 1 | 1 | 0 | 0 | 0 | $R_8, R_1'$ |
| 8 | 0 | 0 | 0 | 1 | 1 | 1 | 1 | 0 | 0 | 0 | $R_8, R_1'$ |
| 9 | 1 | 0 | 0 | 1 | 0 | 1 | 1 | 1 | 0 | 0 | $R_7, R_2'$ |
| 10 | 0 | 1 | 0 | 1 | 1 | 0 | 1 | 0 | 1 | 0 | $R_6, R_3'$ |
| 11 | 1 | 1 | 0 | 1 | 0 | 0 | 1 | 1 | 1 | 0 | $R_5, R_4'$ |
| 12 | 0 | 0 | 1 | 1 | 1 | 1 | 0 | 0 | 0 | 1 | $R_4, R_5'$ |
| 13 | 1 | 0 | 1 | 1 | 0 | 1 | 0 | 1 | 0 | 1 | $R_3, R_6'$ |
| 14 | 0 | 1 | 1 | 1 | 1 | 0 | 0 | 0 | 1 | 1 | $R_2, R_7'$ |
| 15 | 1 | 1 | 1 | 1 | 0 | 0 | 0 | 1 | 1 | 1 | $R_1, R_8'$ |

CCW ↑
CW ↓

CONTROL CIRCUIT FOR STEPPING MOTOR

BACKGROUND OF THE INVENTION

The present invention relates to a control circuit which can raise the frequency of the reference clock signal of a stepping motor to obtain a higher speed of operation for the motor.

A stepping motor which receives a reference clock signal has been often employed in the driving portion of equipment such as X-Y plotters and printers in which a movable object needs to be precisely located in a predetermined place in response to an input signal.

Accordingly, in order to raise the moving speed of the movable object without degrading the resolution (the amount of movement per pulse of the input reference clock signal) in such equipment, the frequency of the reference clock signal must be raised. In order to increase the speed of the movable object by raising the frequency of the reference clock signal, however, a stepping motor of excellent high-speed response characteristics must be used. This has led to the disadvantage that a sharp increase in cost is involved.

Even in the case where a stepping motor of good high-speed response characteristics is employed by allowing for the increase in cost, the frequency of the reference clock signal needs to be raised from a low magnitude to a high magnitude during the starting operation when the frequency of the reference clock signal is made high. This has led to the disadvantage that the control circuit becomes complicated to further increase the cost.

SUMMARY OF THE INVENTION

An object of the present invention is to eliminate the disadvantages of the prior art described above, and to provide a control circuit for a stepping motor which can raise the frequency of a reference clock signal irrespective of the high-speed response characteristics of the stepping motor itself and which permits the high-speed movement of a movable object without degrading resolution.

The present invention for accomplishing the object is characterized in that the excitation state of a stepping motor in each phase is controlled in a stepped waveform including a plurality of steps.

BRIEF DESCRIPTION OF THE DRAWINGS

FIG. 4 is a decode sequence table for explaining the operation of the illustrated embodiment.

DESCRIPTION OF THE INVENTION

First, the fundamental operating principle of the present invention will be described with reference to FIGS. 1 and 2.

Figure 1:
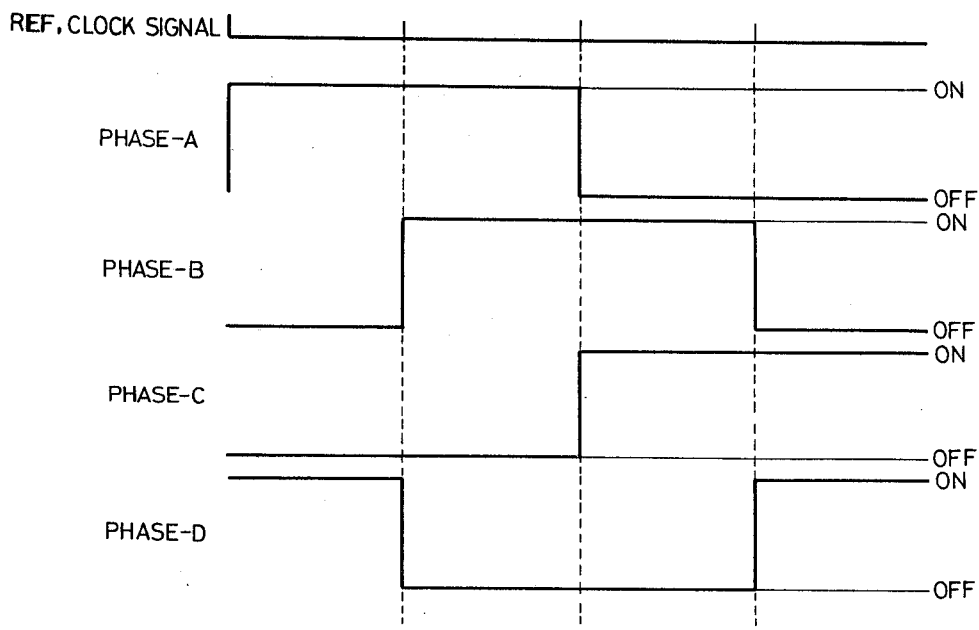
FIG. 1 is a waveform diagram showing the excitation sequence of a 4-phase stepping motor based on the 2-phase simultaneous excitation system.

FIG. 1 shows the excitation sequence of a typical stepping motor (hereinbelow, simply termed "motor") of the prior art. It represents a case where a 4-phase motor is operated by a 2-phase simultaneous excitation system.

As is apparent from the figure, the prior-art control method consists of an on-off control method wherein current flow through the winding of each phase of the motor is switched from 0 (zero) to a rated value. The "on" and "off" states of the respective phases change according to the reference clock signal. The rotor of the motor receives attractive forces (or repulsive forces) from the phases having turned "on" and rotates through predetermined angles in a stepped manner. Thus, the movable device driven by the motor can be located.

Accordingly, when the frequency of the reference clock signal has become high and the interval between the pulses thereof narrows the rotation of the rotor over each predetermined angle cannot follow the state change exactly. In order to raise the frequency of the reference clock signal and to permit a high-speed movement, therefore, the characteristics of the motor itself must be so improved that the period of time required for the rotation of the predetermined angle per pulse of the input clock signal is short, in other words, that the high-speed response characteristics are excellent. Such an improved motor is inevitably high in cost.

Figure 2:
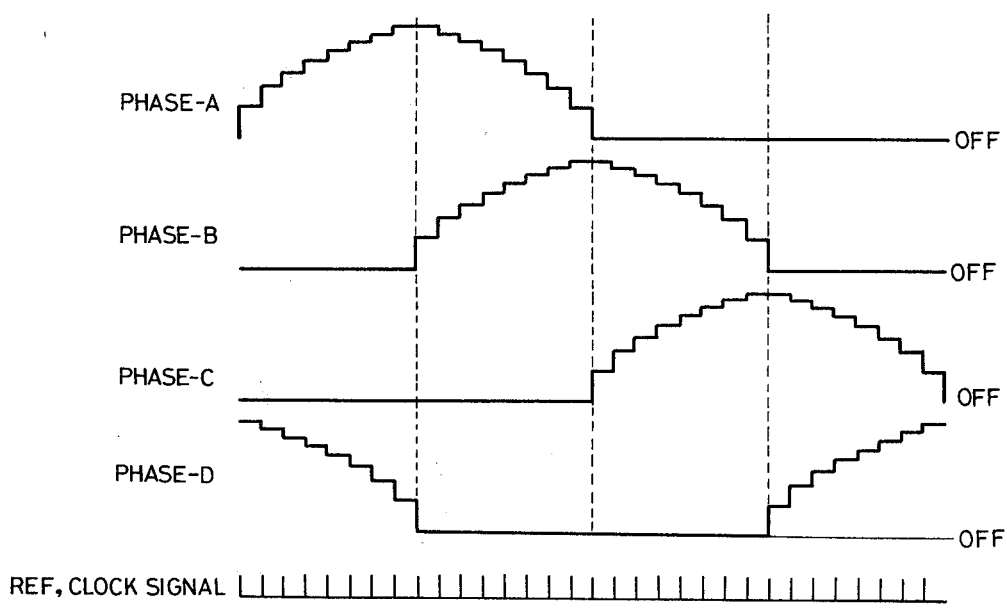
FIG. 2 is a waveform diagram showing the excitation sequence of a control system embodying the present invention.

FIG. 2 shows an excitation sequence which employs the control according to the present invention. Current flow through the winding of each phase of the motor is controlled in a stepped waveform which changes according to the reference clock signal and which consists of n (for example, eight) levels differing in succession.

Accordingly, the motor turns through predetermined angles corresponding to the n different levels in a stepped manner for every pulse of the reference clock signal, and it reaches the same rotational angle as attained every pulse in the prior-art example of FIG. 1 when the number of the pulses of the reference clock signal has reached n. That is, in the prior-art method illustrated in FIG. 1, one location is executed in each of four kinds of excitation modes involving the phase-A and phase-D, the phase-B and phase-A, the phase-C and phase-B, and the phase-D and phase-C, whereas in the method of the present invention illustrated in FIG. 2, n locations are permitted in each of the same four kinds of excitation modes.

Therefore, when the levels of the respective steps in each phase are determined to appropriate values and the moving angles of the rotor to be attained at the respective steps are made equal, a resolution to be attained becomes n times higher than the intrinsic resolution of the motor (according to the method of FIG. 1), so that the drive is permitted at a speed enhanced n times.

In addition, since the amount of movement of the rotor per pulse of the reference clock signal becomes 1/n, the same response characteristics are exhibited even when the frequency of the reference clock signal is raised n times, and equivalently the response characteristics are enhanced n times. In this way, the drive of the stepping motor by the reference clock signal of the higher frequency is permitted without the need to use an expensive motor of excellent response characteristics.

Further, the rotational angle of the rotor per pulse of the reference clock signal is 1/n of that in the prior-art example, so that even when the reference clock signal of a predetermined frequency is supplied from the beginning of a starting operation, the rotation of the motor even in the case where a high-speed drive is carried out by raising the frequency of the reference clock signal, the frequency of the reference clock signal need not be lowered during starting.

Now, an embodiment of a control circuit for a motor according to the present invention will be described with reference to FIGS. 3 to 5.

Figure 3:
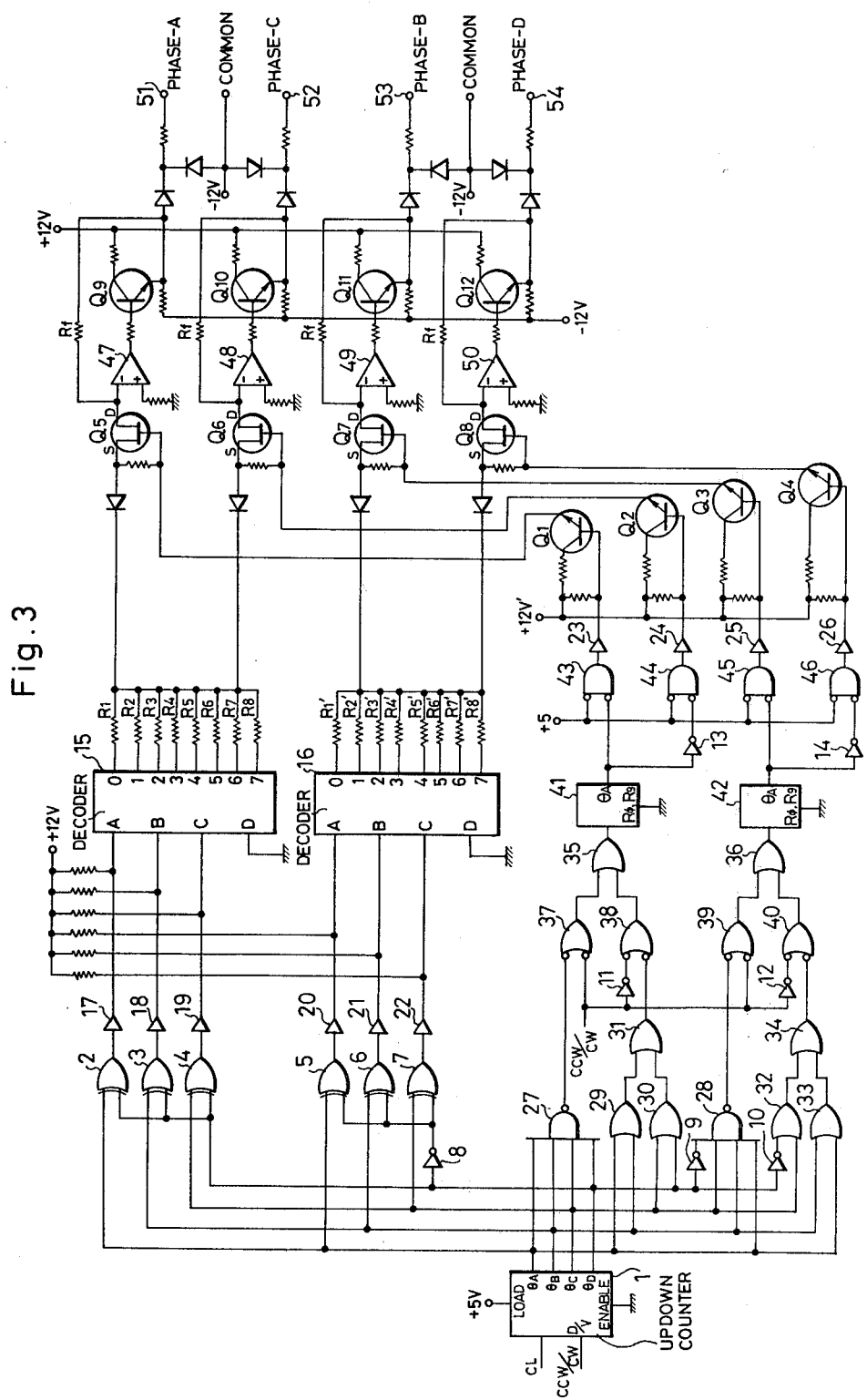
FIG. 3 is a circuit diagram showing an embodiment of the present invention.

FIG. 3 is a circuit diagram of the control circuit. Numeral 1 designates a 4-bit up-down-counter which receives a reference clock signal CL as its count input and a rotating direction-indicative signal CCW/CW as its input for selecting countup or countdown. Numerals 2–7 designate exclusive OR gates (termed "EXOR"), numerals 8–14 inverters, numerals 15 and 16 4-bit decoders, numerals 17–26 amplifiers for interfacing, numerals 27 and 28 4-input NAND gates, numerals 29–36 OR gates, numerals 37–40 NAND gates, numerals 41 and 42 flip-flops (termed "FFs"), numerals 43–46 NOR gates, and numerals 47–50 operational amplifiers. Numerals 51–54 indicate output terminals of phase-A-phase D, respectively, $Q_1$–$Q_4$ represent transistors for driving switching circuits, $Q_5$–$Q_8$ field-effect transistors constructing the analog switching circuits, and $Q_9$–$Q_{12}$ transistors for driving the motor. $R_1$–$R_8$ and $R_1'$–$R_8'$ denote resistors for setting stepped waveform voltages. Each resistor $R_f$ serves for feedback.

Now, the operation of the embodiment will be described.

When the reference clock signal CL and the rotating direction-indicative signal CCW or CW are supplied to the counter 1 from a drive control circuit (not shown) made up of a microcomputer etc., a hexadecimal countup operation is executed with the rotating direction-indicative signal CW, and a hexadecimal countdown operation with the signal CCW. Therefore, the outputs $Q_A$–$Q_D$ of the counter 1 change with the supply of the reference clock signal CL as indicated in FIG. 4.

These outputs $Q_A$–$Q_D$ of the counter 1 are inverted every 8th bit by the EXOR gates 2–7 and then supplied to the inputs A–C of the decoders 15 and 16. If necessary, the interface amplifiers 17–22 may well be used. At this time, the input data of the decoder 16 become the inverted forms of the input data of the decoder 15 as indicated in FIG. 4 because the inverter 8 is connected to one input of each of the EXOR gates 5–7.

Since the resistors $R_1$–$R_8$ and $R_1'$–$R_8'$ are respectively connected to the decode outputs 0–7 of the decoders 15 and 16, one of $R_1$–$R_8$ and one of $R_1'$–$R_8'$ turn "on" with the supply of the reference clock CL as indicated in FIG. 4.

As apparent from FIG. 3, these resistors $R_1$–$R_8$ and $R_1'$–$R_8'$ serve as the input resistors of the operational amplifiers 47–50 when the switching transistors $Q_5$–$Q_8$ turn "on."

On the other hand, the output voltage $V_{OUT}$ of each of the operational amplifiers 47–50 is determined by the magnitudes of the input voltage $V_{IN}$ thereof, the input resistor $R_n$ and the feedback resistor $R_f$, as follows:

$$V_{OUT} = -\frac{R_f}{R_n} \cdot V_{IN}$$

In this case, the input resistors $R_n$ are the resistors $R_1$–$R_8$ and $R_1'$–$R_8'$. After all, the output voltages $V_{OUT}$ of the operational amplifiers 47–50 are determined by the resistors turned "on" by the decode outputs of the decoders 15 and 16.

Figure 5:
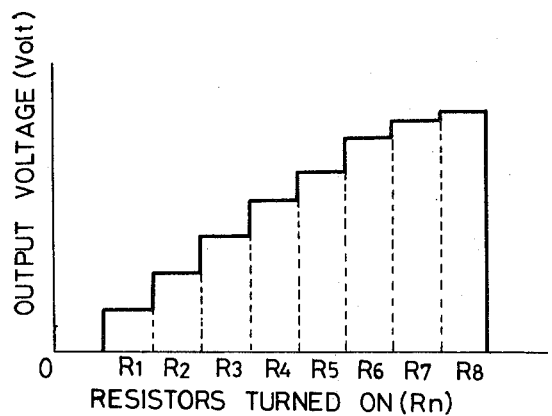
FIG. 5 is a diagram for explaining a stepped waveform voltage.

Therefore, the resistance values of the resistors $R_1$–$R_8$ and $R_1'$–$R_8'$ are set at predetermined values with respect to the resistance value of the feedback resistors $R_f$ in advance so as to obtain the stepped waveform output voltage $V_{OUT}$ shown in FIG. 5.

The transistors $Q_5$–$Q_8$ which construct the analog switch circuits turn "on" and "off" the inputs of the operational amplifiers 47–50 so as to switch the excitation modes based on the 2-phase simultaneous excitation system. The outputs $Q_A$–$Q_D$ of the up-down-counter 1 are processed by the logic circuits which consist of the inverters 9–14, NAND gates 27 and 28, OR gates 29–36, NAND gates 37–40, FFs 41 and 42, and NOR gates 43–46. Switching signals of predetermined levels are produced through the interface amplifiers 23–26 and the transistors $Q_1$–$Q_4$, and are applied to the gates of the transistors $Q_5$–$Q_8$.

Accordingly, as understood by referring to the waveform diagram of FIG. 2 and the outputs $Q_A$–$Q_D$ of the counter 1 in FIG. 4, the following operations are conducted:

1. When the rotating direction-indicative signal is CW;
   (1) The transistor $Q_5$ is "on" in its initial state. After detecting pulse No. 15 of the reference clock signal CL, it has its "on" and "off" successively inverted by pulse No. 0.
   (2) The transistor $Q_6$ is "off" in its initial state. After detecting pulse No. 15 of the reference clock signal CL, it has its "on" and "off" successively inverted by pulse No. 0.
   (3) The transistor $Q_7$ is "on" in its initial state. After detecting pulse No. 7 of the reference clock signal CL, it has its "on" and "off" successively inverted by pulse No. 8.
   (4) After detecting pulse No. 7 of the reference clock signal CL, the transistor $Q_8$ has its "on" and "off" successively inverted by pulse No. 8.
2. When the rotating direction-indicative signal is CCW (direction of No. 15→No. 0 in FIG. 4, the initial condition is No. 0);
   (1) The transistor $Q_5$ is "on" in its initial state. After detecting pulse No. 0, it has its "on" and "off" successively inverted pulse No. 15.
   (2) The transistor $Q_6$ is "off" in its initial state. After detecting pulse No. 0, it has its "on" and "off" successively inverted by pulse No. 15.
   (3) The transistor $Q_7$ is "on" in its initial state. After detecting pulse No. 8, it has its "on" and "off" successively inverted by pulse No. 7.
   (4) The transistor $Q_8$ is "off" in its initial state. After detecting pulse No. 8, it has its "on" and "off" successively inverted by pulse No. 7.

Thus, likewise to the case illustrated in FIG. 1, the exciting currents are distributed to the respective windings of the motor, the phase-A, phase-B, phase-C and phase-D.

As a result, during the period during which the transistor $Q_5$ is "on," the voltage changing in the stepped waveform as shown in FIG. 5 appears at the output of the operational amplifier 47 owing to the resistors $R_1$–$R_8$ sequentially selected by the decoder 15. It is amplified by the transistor $Q_9$ and then taken out at the output terminal 51, from which it is supplied to the phase-A winding of the motor. Likewise, when the other transistors $Q_6$, $Q_7$ and $Q_8$ turn "on," the stepped waveform voltages are supplied to the windings of the phase-B, phase-C and phase-D, respectively.

Accordingly, the stepped waveform excitation currents shown in FIG. 2 are supplied to the windings of the respective phases of the motor in response to the reference clock signal, and the micro-step control is executed.

As already explained, regarding the voltage values of the respective steps of the output voltage $V_{OUT}$ (refer to FIG. 5) of each of the operational amplifiers 47–50, the resistance values of the resistors $R_1$–$R_8$ and $R_1'$–$R_8'$ must be set so that the rotational angles over which the rotor of the motor rotate at the respective steps may become equal.

Figure 6:
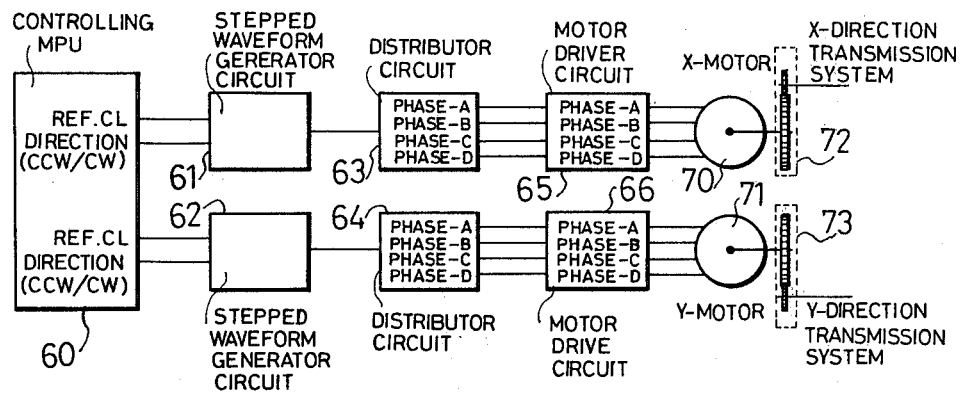
FIG. 6 is a block diagram showing an embodiment of an X-Y plotter to which the present invention has been applied.

FIG. 6 shows an embodiment of an X-Y plotter to which the micro-step control according to the present invention has been applied. Numeral 60 designates a controlling microcomputer, numerals 61 and 62 stepped waveform generator circuits, numerals 63 and 64 distributor circuits for switching excitation modes, numerals 65 and 66 motor driver circuits, numerals 70 and 71 4-phase (stepping) motors, and numerals 72 and 73 speed-up transmissions made up of speed-up gears etc.

Here, the portion at 61, 63 and 65 or at 62, 64 and 66 is the control circuit shown in FIG. 3.

The speed-up transmissions 72 and 73 increase the rotating speeds of the motors 70 and 71 n times (eight times in the embodiment of FIG. 3) and transmit the increased rotations to an X-direction transmission system and Y-direction transmission system, respectively. Thus, the amount of movement per pulse of the reference clock signal can be made the same as in the case of the conventional excitation control illustrated in FIG. 1. In case of the micro-step control having n divided steps, the response rates of the motors 70 and 71 to the reference clock signal become n times equivalently as already explained. After all, in this embodiment, the motors 70 and 71 can be driven by a reference clock signal at a frequency which is n times higher than the reference clock signal frequency determined by the intrinsic clock response characteristics of the motors, and an X-Y plotter capable of high-speed operation can be provided without employing any expensive motor.

The control circuit according to the present invention is not restricted to the X-Y plotter described above, but is applicable to any equipment employing a stepping motor such as a printer, X-Y table, X-Y recorder and electronic copying machine. The equipment capable of high-speed operation can be fabricated at low cost.

As set forth above, according to the present invention, the drive of a stepping motor is subjected to the so-called micro-step control, so that the response characteristics of the motor to a reference clock signal are sharply improved and that the drive employing a reference clock signal at a higher frequency is permitted at the same resolution by using a speed-up rotation transmission system. Therefore, a control circuit for the stepping motor can be provided which can eliminate the disadvantages of the prior art and realize a high-speed drive without employing any expensive motor and which can construct an X-Y plotter, a printer etc. capable of high-speed response at low cost.

What is claimed is:

1. A control circuit for a stepping motor, comprising an up-down counter receiving a reference clock signal and a control signal consisting of rotating-direction indicative signals and executing a count operation with said reference clock signal and having countup and countdown change by said rotating-direction indicative signals, a distributor circuit determining an excitation sequence for respective phases of the polyphase stepping motor in accordance with a count output of said counter, and a stepped wave generator circuit generating a stepped waveform exication signal in accordance with the count output of said counter, an excitation state of each phase of said stepping motor being controlled in a stepped waveform consisting of a plurality of steps, wherein said stepped wave generator circuit comprises a decoder receiving said count output of said counter, a plurality of resistors each having its one terminal connected to a corresponding one of outputs of said decoder, and operational amplifiers each having its input connected to the other terminals of said plurality of resistors and ahaving feedback resistor, and wherein levels of the respective steps of said stepped waveform excitation signal are determined by ratios between resistance values of the respective resistors connected to the outputs of said decoder and a resistance value of said feedback resistors of said operational amplifiers.

2. A control circuit for a stepping motor according to claim 1, wherein a plurality of decoders are disposed, and wherein the levels of the respective steps of said stepped waveform excitation signal are determined by the ratios between the resistance values of the resistors connected to the outputs of said plurality of decoders and the feedback resistors of the operational amplifiers disposed in correspondence with the phases of said stepping motor.

3. A control circuit for a stepping motor comprising an up-down-counter receiving a reference clock signal and a control signal consisting of rotating-direction indicative signals and executing a count operation with said reference clock signal and having its countup and countdown changed by said rotating-direction indicative signals, a distributor circuit determining an excitation sequence for respective phases of the polyphase stepping motor in accordance with a count output of said counter, and a stepped wave generator circuit generating a stepped waveform excitation signal in accordance with the count output of said counter, an excitation state of each phase of said stepping motor being controlled in a stepped waveform consisting of a plurality of steps, wherein said distributor circuit is constructed of logic circuits and determines the excitation sequence for said respective phases of said stepping motor in accordance with the output of said up-down-counter.

* * * * *